United States Patent [19]

Cosenza

[11] Patent Number: 4,493,577

[45] Date of Patent: Jan. 15, 1985

[54] DOUBLE DISC STUD ASSEMBLY FOR THIN WALLED PANELS

[75] Inventor: Frank J. Cosenza, San Pedro, Calif.

[73] Assignee: Rexnord Inc., Brookfield, Wis.

[21] Appl. No.: 410,096

[22] Filed: Aug. 20, 1982

[51] Int. Cl.³ .............................................. F16B 5/02
[52] U.S. Cl. .................................... 403/41; 403/406; 29/526; 411/82
[58] Field of Search ............... 403/406, 405, 266, 265, 403/41, 12, 11; 411/82; 29/526; 228/135, 140

[56] References Cited

U.S. PATENT DOCUMENTS 3,314,465  4/1967  Bien .................................... 403/406

Primary Examiner—Richard J. Scanlan, Jr.

[57] ABSTRACT

A stud assembly, for securing a nonstructural decorative panel to the interior of an aircraft, includes a threaded shank fixed to one side of a flat base, the peripheral area of the opposite side of the base being joined to the peripheral area of a flat disc, the opposite side of the flat disc having an adhesive applied thereto, so that, when a nut is tightened on the shank to its proper torque level, the tensile force in the shank allows a dimpling effect in the flat base but not in the flat disc or the panel.

2 Claims, 4 Drawing Figures

DOUBLE DISC STUD ASSEMBLY FOR THIN WALLED PANELS

BACKGROUND OF THE INVENTION

This invention relates generally to a fastener whose function is to secure a panel to some supporting structure and, more particularly, to an apparatus and method for securing a nonstructural internal decorator panel to an attachment device in the interior of an aircraft.

In aircraft construction it has become increasingly more important to reduce weight, in order to decrease fuel consumption. Reduction in weight can be accomplished in different ways—by using lighter materials, by using fewer components, or by reducing the size of the components. Interior decorator panels can easily be reduced in weight by decreasing the thickness of the panels. When thinner decorator panels are used, however, studs for securing the panels to attachment devices can no longer be imbedded in the panel but must be adhesively attached to the side of the panel away from the passengers. When a nut is run up on the adhesively attached stud assembly to lock the assembly to an attachment device, a depression occurs on the passenger side of the panel. This depression or dimpling action occurs due to the nut being tightened and causing a tensile deformation in the stud base, into the adhesive, and finally into the decorator panel.

Thus, from a cosmetic point of view, the indented or dimpled surface in the interior of the aircraft is not desirable, and is especially magnified when the cabin lights along the window area are illuminated.

Accordingly, there exists a need for an apparatus and method for securing a decorator panel to an attachment device in the interior of an aircraft wherein the adhesively bonded stud assembly will not have a dimpling effect on the exterior of the panel when the panel is attached to an attachment device in the aircraft.

SUMMARY OF THE INVENTION

In accordance with the present invention, there is provided a stud assembly that attaches, generally by a hot-melt adhesive process, to the back side of the interior decorator panels of an aircraft and a method for attaching these nonstructural panels to the aircraft which, when a nut is run up on the stud to lock the panel to the attachment bracket, the nut will cause indentations in the base of the stud assembly but not on the interior surface of the panels.

The stud assembly, in its preferred form, comprises a threaded shank fixedly attached to one face of a flexible, circular base member, the threaded shank insertable through an aperture in an attachment device which could be brackets for electrical wiring harnesses, hoses, etc., and which generally has an adjustment clearance to permit radial movement of the threaded shank in the attachment aperture, a circular disc member attached to the circular base member, the peripheral area of the circular disc joined only to the peripheral area of the base member so that one face of the circular disc member is juxtaposed generally with the opposite face of the circular base member, a layer of adhesive material on the opposite face of the circular disc member, and a nut rotatable along the threaded shank which causes movement of the threaded shank in an axial direction away from the decorative panel when the nut is tightened whereby the flexure in the circular base member and the bellows effect between the circular base member and the circular disc member allows the dimpling effect in the circular base member but does not allow the dimpling of the circular disc member or the decorative panel.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

In the accompanying drawings, forming a part of this specification, and in which reference numerals shown in the drawings designate like or corresponding parts throughout the same.

DESCRIPTION OF THE PREFERRED EMBODIMENT

Figure 1:
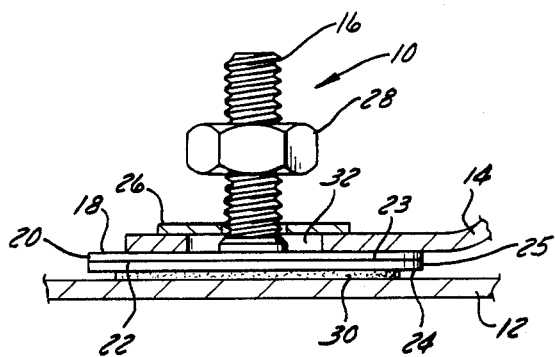
FIG. 1 is a partly sectioned elevation view of a stud assembly of the present invention adhesively secured to a panel with a nut not tightened.

In accordance with the figures, the invention comprises a stud assembly 10 for securing a nonstructural panel 12 to an attachment device 14 e.g. brackets, electrical wiring, hoses, etc., on the fuselage of an aircraft. The stud assembly 10, shown in FIG. 1, is composed of any suitable material such as steel, plastic, etc. and has a threaded shank 16 fixedly attached perpendicular to a face 18 of a substantially circular base 20 and carrying a nut 28 and a washer 26. The opposite face 22 of the base 20 is juxtaposed with a face 23 of a circular disc member 25. Adhesive 30 is applied generally to the complete opposite face 24 of the circular disc member 25 so that the stud assembly 10 may be attached to the panel 12. The base 20 and the circular disc member 25 are secured together only at their respective periphery, generally by welding, which allows the base 20 to act like a bellows when loaded.

Figure 2:
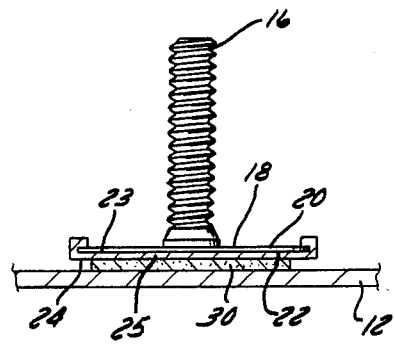
FIG. 2 is another embodiment of the stud assembly of the present invention.

An additional embodiment of the present invention comprises a mechanical attachment, shown in FIG. 2, wherein the circular disc member 25 is generally larger than the base 20 so that the peripheral area of the circular disc member 22 may be folded up around the periphery of the base member 20, such that a portion of the face 23 of the circular disc member 25 contacts the face 18 of the circular base 20. This mechanical attachment of the base 20 to the circular disc member 25 also allows the base 20 to act like a bellows when adhesive 30 is applied to the opposite face 24 of the circular disc 25 to secure the stud assembly 10 to the panel 12 and the stud assembly 10 is loaded in the axial direction. Accordingly, sufficient axially force will only cause an indentation 27 in the opposite face 22 of base 20 as shown in FIG. 3.

The attachment device 14 has an opening 32 therethrough for receipt of the threaded shank 16 which is large enough to permit radial adjustment between the threaded shank 16 and the opening 32. As illustrated in FIGS. 3 and 4, it is the oversizing or adjustment clearance of the opening 32 which causes the base 20 to dimple when the nut 28 is tightened to its proper torque level.

As illustrated in FIG. 4, the prior art stud assemblies comprised a threaded shank 40 with a nut 42 thereon, the shank 40 being attached to a face 43 of a small, flat base 44, the opposite face 45 of said base 44 being completely coated with an adhesive 46. Since the nonstructural interior decorator panels 12 are thinner than the ordinary panels once used in aircraft, and since the opening 32 in the attachment device 14 is oversized to compensate for misalignment therebetween, when the nut 42 was run on the shank 40 to lock the attachment device 14 in place, a dimpling effect occurred not only in the base 44, but also in the panel 12. This dimpling action occurred due to the nut 42 being tightened and causing a tensile deformation in the base 44, into the adhesive 46 and finally into the attached panel 12. This dimpling effect or indentation in the interior panels 12 of the aircraft was not acceptable.

Figure 3:
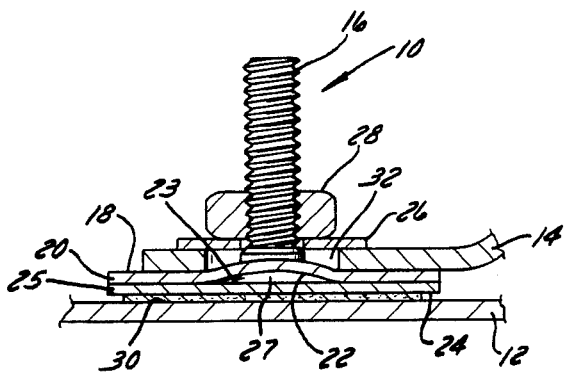
FIG. 3 is a cross-sectioned view of FIG. 1 along the centerline of the shank with the nut tightened to its proper torque level.
Figure 4:
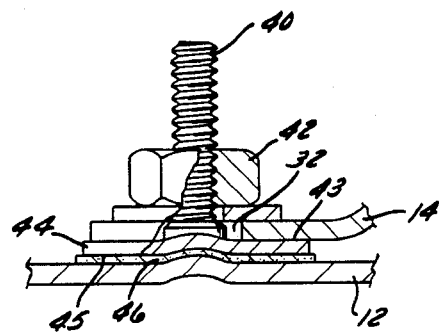
FIG. 4 is a partly broken away and a partly sectioned view of the prior art.

In the present invention, as illustrated in FIG. 3, the dimpled or depressed surface in the interior panel 12 is eliminated by attaching a circular disc member 25 to the circular base 20, said disc and said base 20 generally the same size as the prior art base 44, and applying the adhesive 30 to the opposite face 24 of the circular disc member 25, so that the dimpling effect occurs only in the base 20 but not in the attached circular disc member 25 or the attached panel 12. The flexure in the base 20 and the bellows effect of the base 20 do not allow the dimpling of the attached panel 12 when secured to an attachment device 14.

In applying the stud assembly 10 to the decorator panel 12 which is supported on the interior wall portion of the aircraft, the adhesive 30 is secured against the side of the panel 12 away from the interior of the aircraft at a position, spaced so that, said threaded shank 16 is received in said opening 32. When the stud assembly is bonded to the panel 12 and the panel supported on the attachment device 14, and when the nut 28 is run up on the shank 16 to lock the panel to the attachment device, a dimpling effect occurs only in the base 20 and not in the circular disc member 25 or the panel 12.

What is claimed is:

1. In a stud assembly of the type having a threaded shank fixedly attached perpendicular to one surface of a base member and a nut means rotatable along the threaded shank for securing a nonstructural panel to an attachment whereby the threaded shank is insertable through an aperture in the attachment device, the improvement comprises:

a disc member having a first surface joined to a surface of the base member opposite the first-mentioned base member surface, and a second surface opposite said first disc member surface; and an adhesive means, disposed on at least a portion of said second surface of said disc member, for holding and securing the stud assembly to the nonstructural panel, with said disc member and the base member being joined at adjacent peripheries in a manner allowing a portion of the base member to resiliently, deform apart from said disc member and the nonstructural panel when the nut means is rotated to cause movement of the shank in an axial direction away from the nonstructural panel.

2. An improved method of securing a nonstructural panel to an attachment device comprising the steps of:

adhesively bonding a stud assembly to one surface of the panel, said stud assembly having a threaded shank fixedly attached to a surface of a thin, base member, and a disc member having one surface joined to said base member only at their respective peripheries with said adhesive being applied to the opposite surface of said disc member, inserting said threaded shank through an oversized aperture in the attachment device and applying a nut member to said threaded stud whereby a portion of said base member is forced axially into said aperture, with the said disc member and the nonstructural panel remaining free from indentations.

* * * * *